(12) United States Patent
Matlack et al.

(10) Patent No.: US 7,866,925 B1
(45) Date of Patent: Jan. 11, 2011

(54) ASSEMBLY FOR SECURING CARGO UPON A LOAD BED

(75) Inventors: Larry W. Matlack, Haven, KS (US); William L. Matlack, Haven, KS (US)

(73) Assignee: Stinger, Inc., Haven, KS (US)

( * ) Notice: Subject to any disclaimer, the term of this patent is extended or adjusted under 35 U.S.C. 154(b) by 383 days.

(21) Appl. No.: 12/184,840

(22) Filed: Aug. 1, 2008

(51) Int. Cl.
*B60P 7/08* (2006.01)

(52) U.S. Cl. .......................... 410/34; 410/97; 410/100; 410/120

(58) Field of Classification Search ............. 410/32, 410/34, 96, 97, 100, 120, 129; 414/24.5, 414/111; 56/473.5
See application file for complete search history.

(56) References Cited

U.S. PATENT DOCUMENTS

| | | | |
|---|---|---|---|
| 3,827,353 A | 8/1974 | Isberg | |
| 4,078,682 A | 3/1978 | Johnson, Jr. | |
| 4,261,676 A | 4/1981 | Balling, Sr. | |
| 4,359,307 A | 11/1982 | Johnson, Jr. | |
| 5,707,200 A | 1/1998 | Liu | |
| 5,971,424 A | 10/1999 | Ingalls | |
| 6,053,685 A | 4/2000 | Tomchak | |
| 6,312,205 B1 | 11/2001 | Vandenburg | |
| 6,655,266 B2 | 12/2003 | Brown, Jr. | |
| 7,044,700 B2 | 5/2006 | Tessier et al. | |
| 7,367,765 B2 * | 5/2008 | Frett | 410/118 |
| 2006/0251501 A1 | 11/2006 | Koehn et al. | |

* cited by examiner

*Primary Examiner*—Stephen Gordon
(74) *Attorney, Agent, or Firm*—Kenneth H. Jack; David & Jack, LLC

(57) ABSTRACT

An assembly for securing cargo, the assembly incorporating a load bed having oppositely positioned paired sides; at least a first pair of arms, each arm having a proximal end and a distal end; arm attaching joints interconnecting the load bed and the proximal ends of the arms, the arm attachments oppositely positioning the arms at one of the load bed's oppositely positioned paired sides; a tie having a pair of ends; tie attaching connections interconnecting the tie's ends and the arms' distal ends so that the load bed, the arms, and the tie border a first cargo securing space; and telescoping quill and shaft combinations connected operatively to the arms, the telescoping quill and shaft combinations being adapted for alternatively distally expanding and proximally contracting the first cargo securing space.

26 Claims, 10 Drawing Sheets

ASSEMBLY FOR SECURING CARGO UPON A LOAD BED

FIELD OF THE INVENTION

This invention relates to cargo carrying load beds. More particularly, this invention relates to apparatus and assemblies adapted for securing cargo upon load beds.

BACKGROUND OF THE INVENTION

A common configuration of a truck or trailer cargo carrying load bed presents an oblong and rectangular flat or stepped loading surface having no front, rear, or lateral side walls for securing cargo carried thereon. Where cargo such as rectangular bales of hay or straw are to be carried upon such a load bed, means for securing such bales thereon are necessarily provided in order to prevent the carried bales from shifting, sliding or toppling during carriage.

A commonly known means for securing baled cargo such as is discussed above upon a flat or stepped load bed provides a matrix of flexible yet strong tie straps or belts. Such straps or belts are typically extended laterally and longitudinally over the cargo carried upon the load bed, the ends of such straps or belts being fixedly attached to the load bed. Typically, one of the fixed attachments of each of such cargo securing straps or belts comprises a ratchet and pawl type strap winch which may be utilized for tightening the strap or belt over the cargo.

A commonly known drawback or deficiency associated with securing cargo upon a flat or stepped load bed through usage of winch tightened straps, as described above, is that utilization of such common assembly undesirably wastes labor and time. Tasks of manually extending straps over carried cargo, manually tightening such straps, manually releasing such straps, and manually withdrawing such straps for cargo removal are each time consuming and labor intensive procedures.

The instant inventive assembly for load bed cargo securing solves or ameliorates drawbacks and deficiencies of common flat or stepped load bed cargo securing assemblies such as those discussed above, by providing and incorporating a specialized configuration of articulating and telescoping arms and ties which automate and speed load bed cargo loading and off-loading procedures.

BRIEF SUMMARY OF THE INVENTION

A first structural component of the instant inventive assembly for load bed cargo securing comprises a load bed having oppositely positioned paired sides. Where the load bed is that of a flat bed trailer of the type typically pulled by a semi-tractor, the longitudinally extending left and right sides of such load bed are typically 45 feet long, 48 feet long, or 53 feet long. The front and rear sides or ends of such load bed are typically 8½ feet, providing the load bed a typical 8½ foot width. While descriptions set forth below focus upon such semi-tractor pulled flat bed trailers, the scope of the instant invention is considered to extend equally to fixed chassis truck load beds and other types of cargo carrying wheeled load beds.

A further structural component of the instant inventive assembly for load bed cargo securing comprises at least a first pair of arms, each arm having a proximal end and a distal end. Arm attaching means are also provided, such means interconnecting the load bed and the proximal or lower ends of such arms. Necessarily, the arm attaching means interconnect the arms at opposite sides of the load bed, either at the load bed's opposing left and right sides or at the load bed's opposing front and rear sides.

A further structural component of the instant inventive assembly for load bed cargo securing comprises a tie having a pair of ends, in combination with attaching means which connect the tie's ends to the arms' distal or upper ends. Upon such interconnection of the tie and the arms, a first cargo securing space is defined, such space being bordered from above by the tie, from below by the load bed, and being bordered laterally (either left and right or front to rear, as the case may be) by the arms.

A further structural component of the instant inventive assembly for load bed cargo securing comprises telescoping means connected operatively to the arms, the telescoping means being adapted for alternatively expanding such first cargo securing space by moving the tie in the distal direction and contracting such space by moving the tie in the proximal direction. In operation of the instant invention, cargo such as hay bales placed within such first cargo securing space may be secured for over the road transport by actuating the telescoping means to contract the tie downwardly against the cargo. Oppositely actuating the telescoping means to expand such first cargo securing space conveniently allows for off loading of such cargo.

In a preferred embodiment of the instant invention, the telescoping means configures each arm to comprise a quill and slide shaft assembly in combination with a linear motion actuator attached there across. Hydraulic cylinders comprise a preferred linear motion actuator. Notwithstanding, other commonly known linear motion actuators such as jack screw assemblies, ball screw assemblies, pneumatic cylinders, and rack and pinion gear assemblies are considered to fall within the scope of the invention. Additionally, other commonly known shaft or arm telescoping assemblies such as slide ridge and slide channel assemblies are considered to fall within the scope of the instant invention.

A further component of the instant inventive assembly for load bed cargo securing preferably comprises first articulating means connected operatively to the arms. Preferably, such first articulating means are adapted for either facilitating pivoting and counter-pivoting motions of the upper or distal ends of the arms (where such arms are mounted at the opposite front and rear ends of the load bed) or for facilitating simultaneous pivoting and counter-pivoting motions of both the proximal and distal ends of the arms (where such arms are mounted at opposite left and right sides of the load bed). Configurations of and operation of such first articulating means are further discussed below.

Where the arms of the instant inventive assembly for load bed cargo securing are attached at the load bed's opposite left and right lateral sides, second articulating means are preferably further provided, the second articulating means being adapted for longitudinally pivoting the arms along with the tie which laterally interconnects the distal ends of the arms. Such pivoting motion preferably moves the arms between a cargo loading position and a cargo securing position. Upon downward pivoting of such left and right arms to their cargo loading positions, such arms preferably are co-extensive with the load bed to allow cargo such as hay bales to be extended thereover for placement upon the load bed. Upon opposite upward pivoting motions of such arms to their cargo securing positions, such arms preferably extend upwardly and substantially perpendicularly from the load bed, causing the laterally extending tie to move in an arc to a position overlying the cargo. Upon such pivoting motion of the arms to their cargo securing positions, the telescoping means may be actuated to downwardly contract the first cargo securing space, downwardly compressing the tie against such cargo and securing such cargo upon the load bed.

In the preferred embodiment of the instant invention, the second articulating means preferably comprises a combination of a pivot axle spanning between the proximal or lower ends of the arms, a plurality of pivot bearings receiving the pivot axle, a lever arm fixedly attached to the axle, and lever turning means, preferably a hydraulic cylinder, which is operatively connected to a distal end of the lever. While the above described mechanical combination comprises a preferred second articulating means, other commonly known means for mechanically pivoting cantilevered arm structures are considered to fall within the scope of the invention.

In order to assure that neither of the left and right arms impinge against the ends of the loaded hay bales upon pivoting motion from the arms' cargo loading positions to their cargo securing positions, the first articulating means are preferably adapted to normally widen the cargo securing space by outwardly moving medial portions of the left and right arms. In a preferred configuration, such adaptation preferably comprises short lower and upper arm sections respectively pivotally mounted upon the proximal and distal ends of the left and right arms. Such short pivoting sections are preferably spring biased to normally pivot outwardly away from the cargo securing space and to commensurately normally outwardly laterally move the medial portions of the arms. Upon actuation of the arms' telescoping means to downwardly pull the tie and to contract the first cargo securing space, such short proximal and distal arm sections oppositely inwardly pivot toward the load securing space while such medial portions commensurately move inwardly toward the secured cargo.

Also in a preferred embodiment of the instant assembly for load bed cargo securing, the pair of arms may be alternatively configured as bulkheads and mounted at the opposing front and rear ends or sides of the load bed. When the arms are so mounted, longitudinal clamping means are also preferably provided, such means being operatively connected to the arms. Preferably, the clamping means are adapted to alternatively increase and decrease the arms' longitudinal displacement with respect to each other. Operation of the clamping means to increase the longitudinal displacement of such arms facilitates loading of cargo such as hay bales upon the load bed and between such front and rear arms, and opposite actuation of the clamping means to decrease such longitudinal displacement advantageously longitudinally compresses such hay bale cargo, securing the cargo upon the load bed. Where clamping means are associated with such front and rear mounted arms, such means preferably comprise a third quill and slide shaft assembly which facilitates slidable longitudinal motion of at least one of the arms. Preferably, a third linear motion actuator is operatively connected to such third quill and slide shaft assembly, such third linear motion actuator preferably comprising a hydraulic cylinder. As with the first and second telescoping means which operatively vertically extend and retract the paired arms, other commonly known linear motion actuators may be operatively connected to such front and rear installed arms for facilitating such longitudinal clamping motion.

Where the arm components of the instant invention are installed at the front and rear ends of the load bed, as described above, such arms are preferably laterally widened to provide an enhanced width clamp jaw surface for compression against loaded hay bales. Also in such front and rear arm installation configuration, the first articulating means is preferably configured to comprise short pivotable distal end segments of the arms, along with biasing means for normally pivoting such upper distal ends outwardly and away from the longitudinally extending cargo securing space. Such biasing means preferably comprises springs which advantageously continuously impose tension upon a flexible tie strap which preferably extends longitudinally between the distal ends of the arms.

In a preferred embodiment of the instant assembly for load bed cargo securing, no single pair of oppositely positioned arms is installed upon the load bed. Instead, arm pairs are preferably installed both at the opposing front and rear sides of the load bed, and at the opposing left and right sides of the load bed. Preferably, multiple pairs of arms and laterally crossing ties are installed at the load bed's left and right sides.

In operation of such preferred assembly, actuation of the telescoping means, which are preferably connected operatively to the preferred front and rear arms, may upwardly raise the longitudinally extending tie, such motion upwardly expanding the assemblies' longitudinally extending cargo securing space. Such upward space expansion advantageously facilitates lateral positioning and stacking of hay bale cargo beneath such tie. Upon such upward space expansion, the first articulating means which are associated with such front and rear installed arms (i.e., the preferred pivoting distal ends of such arms) preferably spring biases outwardly and away from such cargo securing space to provide constant tension to the longitudinally extending flexible tie. Simultaneously with the upward telescoping extension of such front and rear arms, the clamping means which are preferably associated with such arms may be actuated to increase the longitudinal displacement there between, such motion further facilitating loading of hay bale cargo between such arms. Opposite actuation of such telescoping means and clamping means vertically and longitudinally contracts the cargo securing space which extends longitudinally between such front and rear arms, such motion advantageously clamping and compressing such loaded hay bales both in the vertical and longitudinal directions.

The multiple pairs of arms which are preferably installed at the load bed's left and right sides operate substantially similarly with such front and rear installed arms with the exception that the second articulating means associated with such left and right may downwardly pivot the left and right arms. Pivoting motion of such left and right arms temporarily makes them co-extensive with the load bed, and advantageously facilitates lateral hay bale cargo loading.

Operation of the instant assembly for load bed cargo securing automates the process of vertically and longitudinally compressing loaded cargo such as hay bales, advantageously reducing labor and time expenditures associated with cargo loading and off loading.

Accordingly, it is an object of the instant invention to provide an assembly for load bed cargo securing which provides a plurality of telescoping arm and tie combinations which are mechanically and operatively connected to a load bed for alternatively expanding and contracting a cargo securing spaces there between.

Other and further objects, benefits, and advantages of the instant invention have been described above, and will become further known to those skilled in the art upon review of the Detailed Description which follows, and upon review of the appended drawings.

DETAILED DESCRIPTION OF A PREFERRED EMBODIMENT

Figure 1:
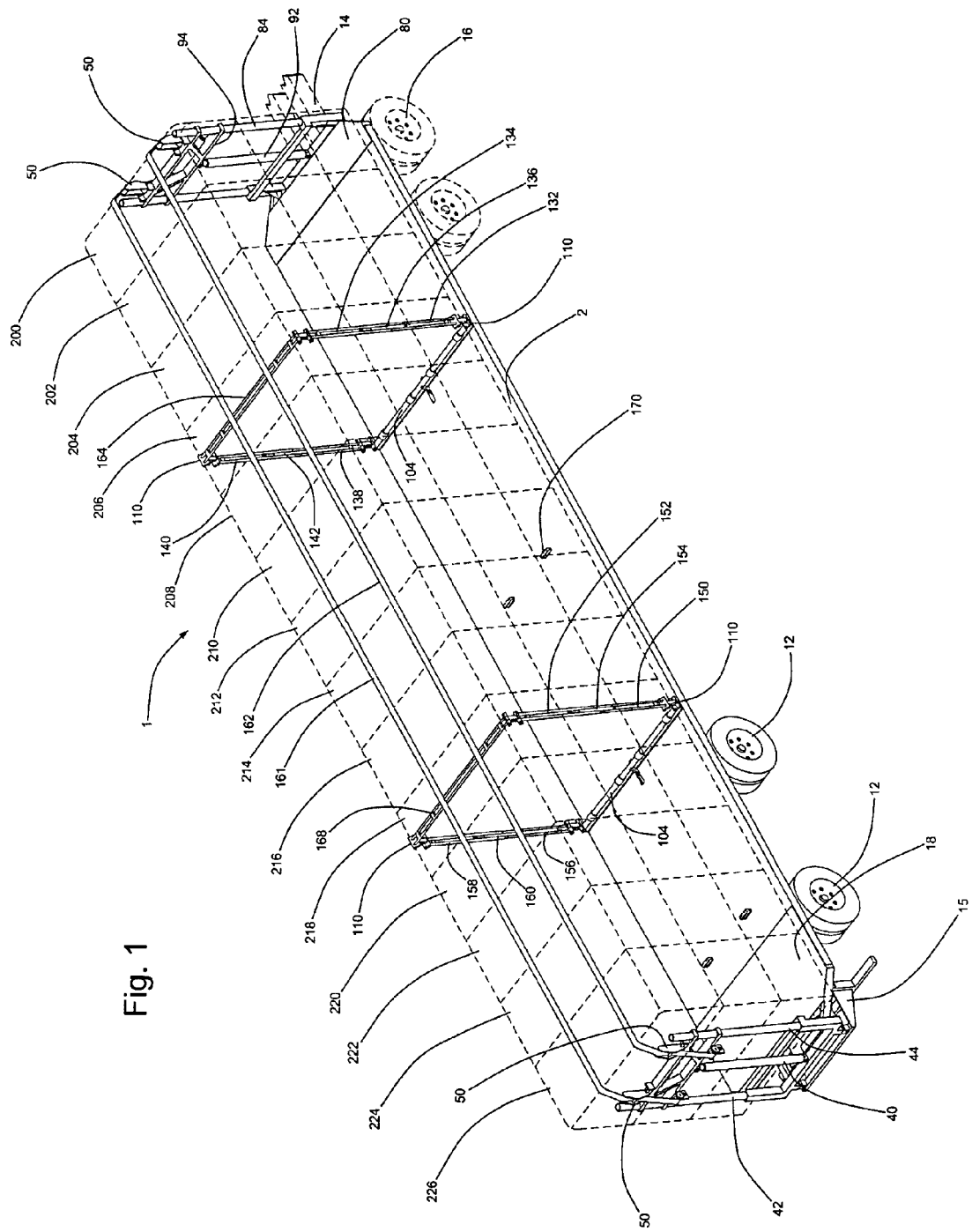
FIG. 1 is a preferred embodiment of the instant inventive load bed cargo securing assembly, the view showing the assembly in its load securing configuration.
Figure 3:
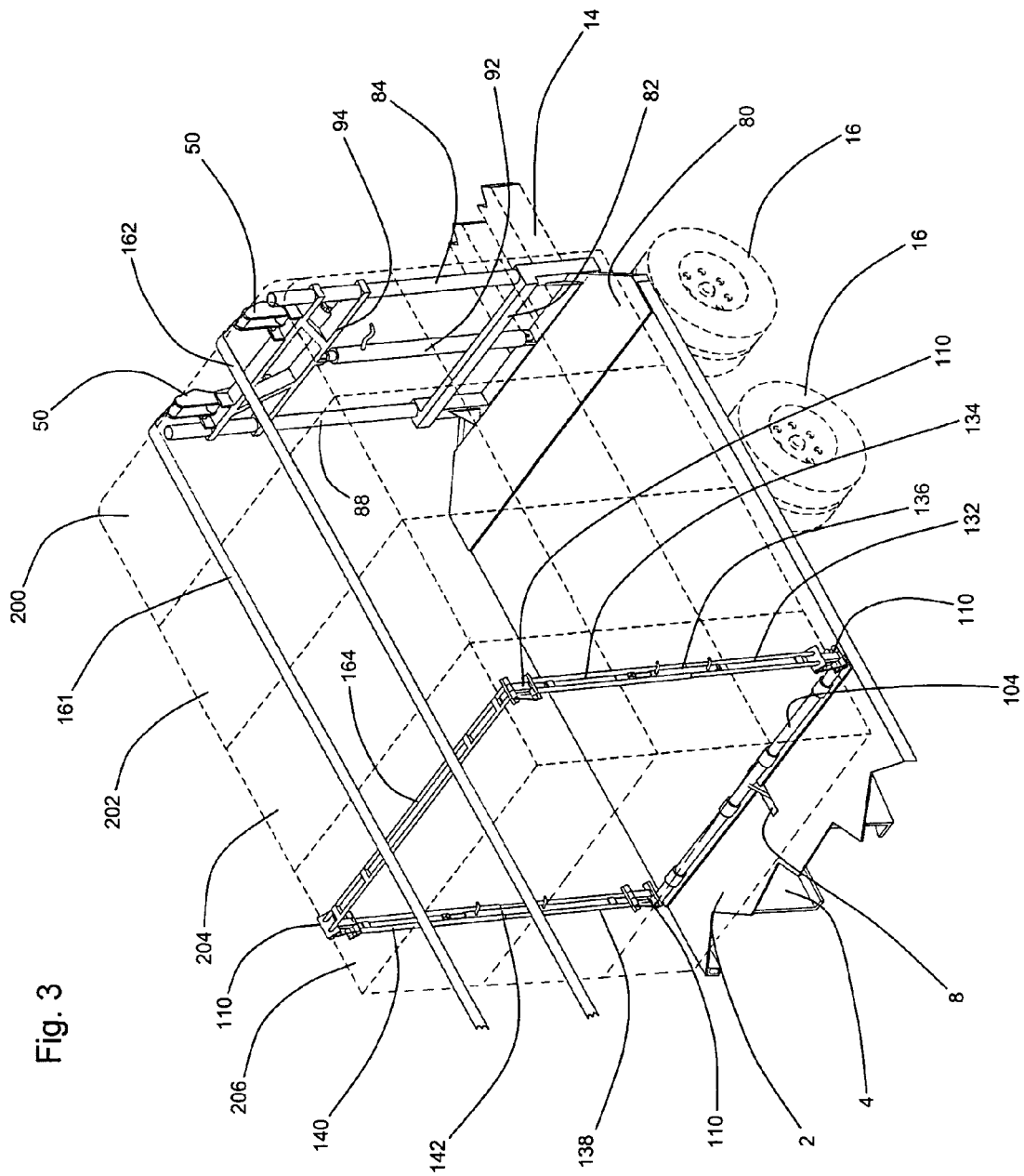
FIG. 3 is a magnified view of an alternative portion of the structure depicted in FIG. 1.
Figure 7:
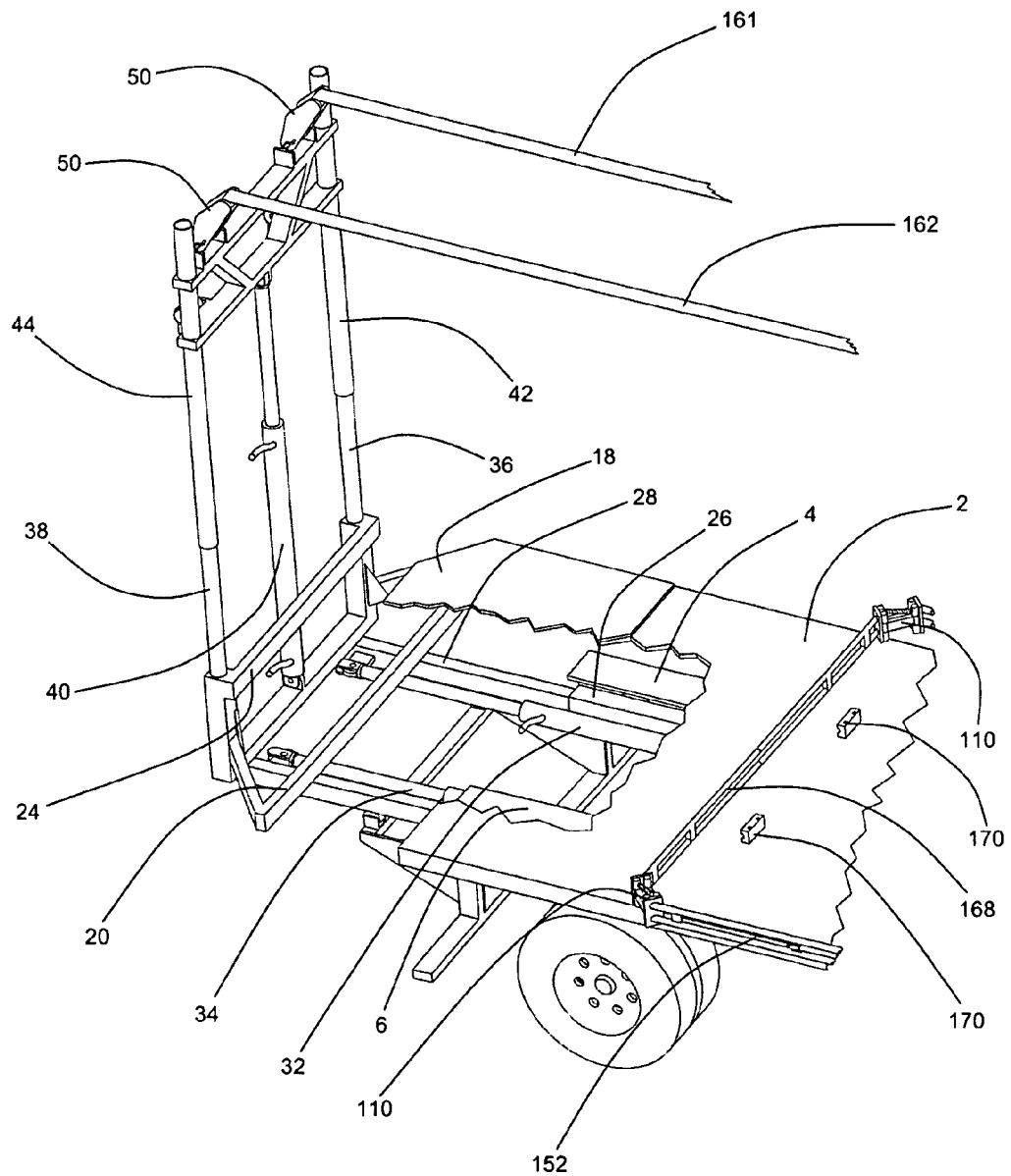
FIG. 7 represents a partial view of the rearward end of the instant inventive assembly, the view including a "cut away" portion within the flat bed loading surface.

Referring now to the drawings, and in particular to FIG. 1, a preferred embodiment of the instant inventive assembly for load bed cargo securing is referred to generally by Reference Arrow 1. The assembly preferably comprises a rectangular and longitudinally oblongated load bed 2. Referring further simultaneously to FIGS. 3 and 7, the load bed 2 is rigidly supported by a pair of longitudinally extending chassis beams 4 and 6. The rear of the load bed 2 preferably supports a bumper frame structure 15 and is supported by wheels 12. The front of the load bed 2 is typically supported via a fifth wheel linkage by a tractor trailer 14 which is partially shown in ghost, such tractor trailer having wheels 16.

Referring to FIG. 3, a forwardly mounted and vertically extending bulkhead arm is depicted, such arm being rigidly supported by a base plate 80, such plate being rigidly and fixedly mounted upon the forward end of the load bed 2. The forward end of the base plate 80 rigidly supports a laterally extending support frame 82, such frame 82 rigidly supporting, referring further to FIG. 4, a pair of upwardly extending right and left slide shafts 86 and 90. Right and left slide sleeves or quills 84 and 88 are preferably slidably mounted over the right and left slide shafts 86 and 90, and an upper frame member 94 rigidly interconnects the upper or distal ends of the slide sleeves 84 and 88. A hydraulic cylinder 92 spans between the lower frame member 82 and the upper frame member 94 for alternatively raising and lowering the upper frame member 94 along with the right and left slide sleeves 84 and 88. FIG. 3 particularly shows the hydraulic cylinder 92 upon operation to downwardly retract both the frame 94 and the right and left slide sleeves 84 and 88, and FIG. 4 particularly shows an opposite operation of cylinder 92 to upwardly extend such structures.

Figure 4:
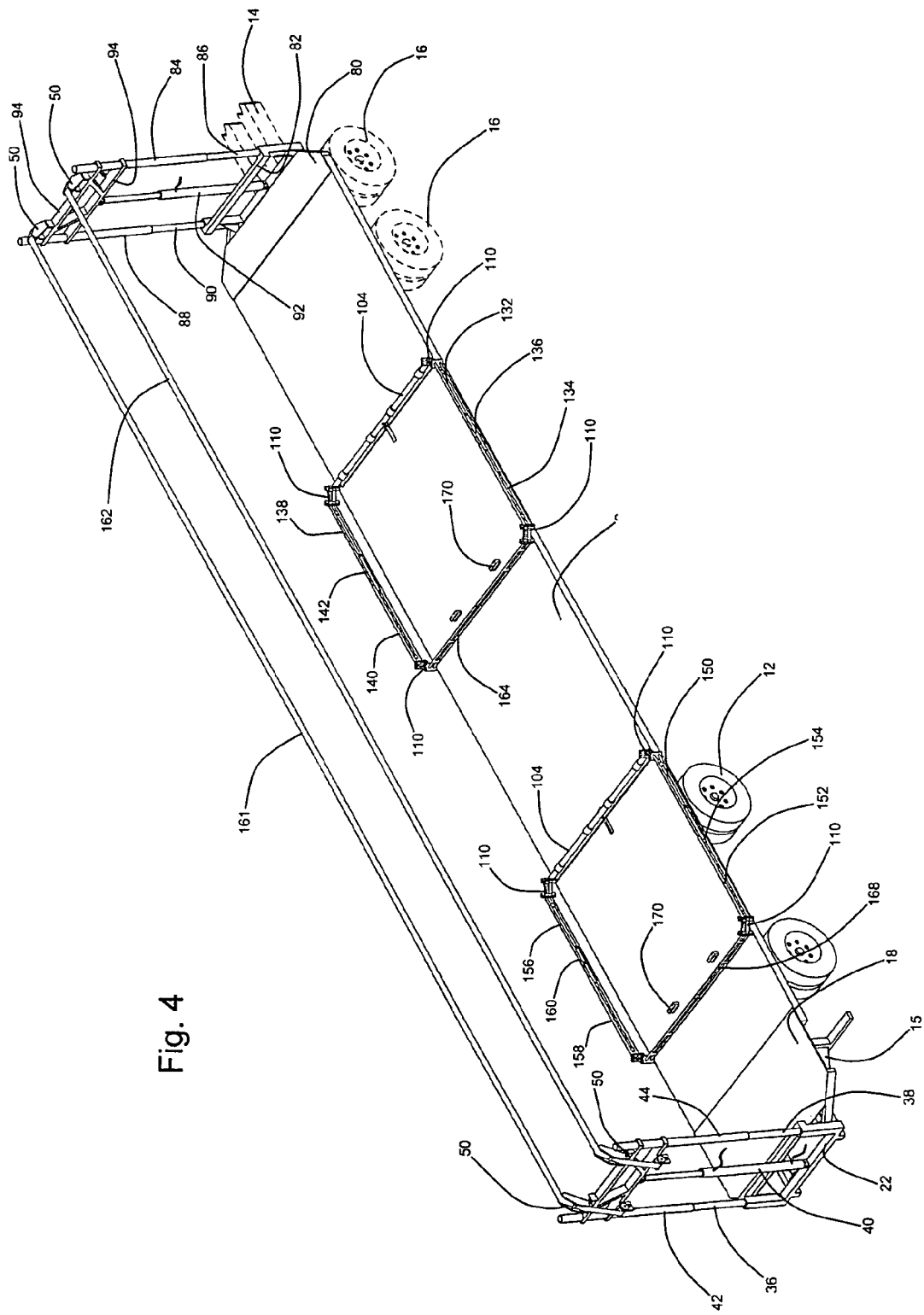
FIG. 4 redepicts FIG. 1, the view of FIG. 4 alternatively showing the structure of FIG. 1 in its cargo loading configuration.

Referring further simultaneously to FIGS. 3 and 4, the combination of the base plate 80, the lower frame 82, the right and left slide shafts 86 and 90, the right and left slide sleeves 84 and 88, and the upper frame 94 constitute portions of a forwardly mounted tie supporting arm which additionally functions as a forward bulkhead member. The hydraulic cylinder 92 constitutes a telescoping means for alternatively vertically extending and retracting such arm, and the extreme upper or distal end of such arm preferably comprises articulating strap tensioning arm segments 50 which support and provide constant spring biased pivoting tension to tie members which preferably comprise right and left straps or belts 162 and 161.

Figure 2:
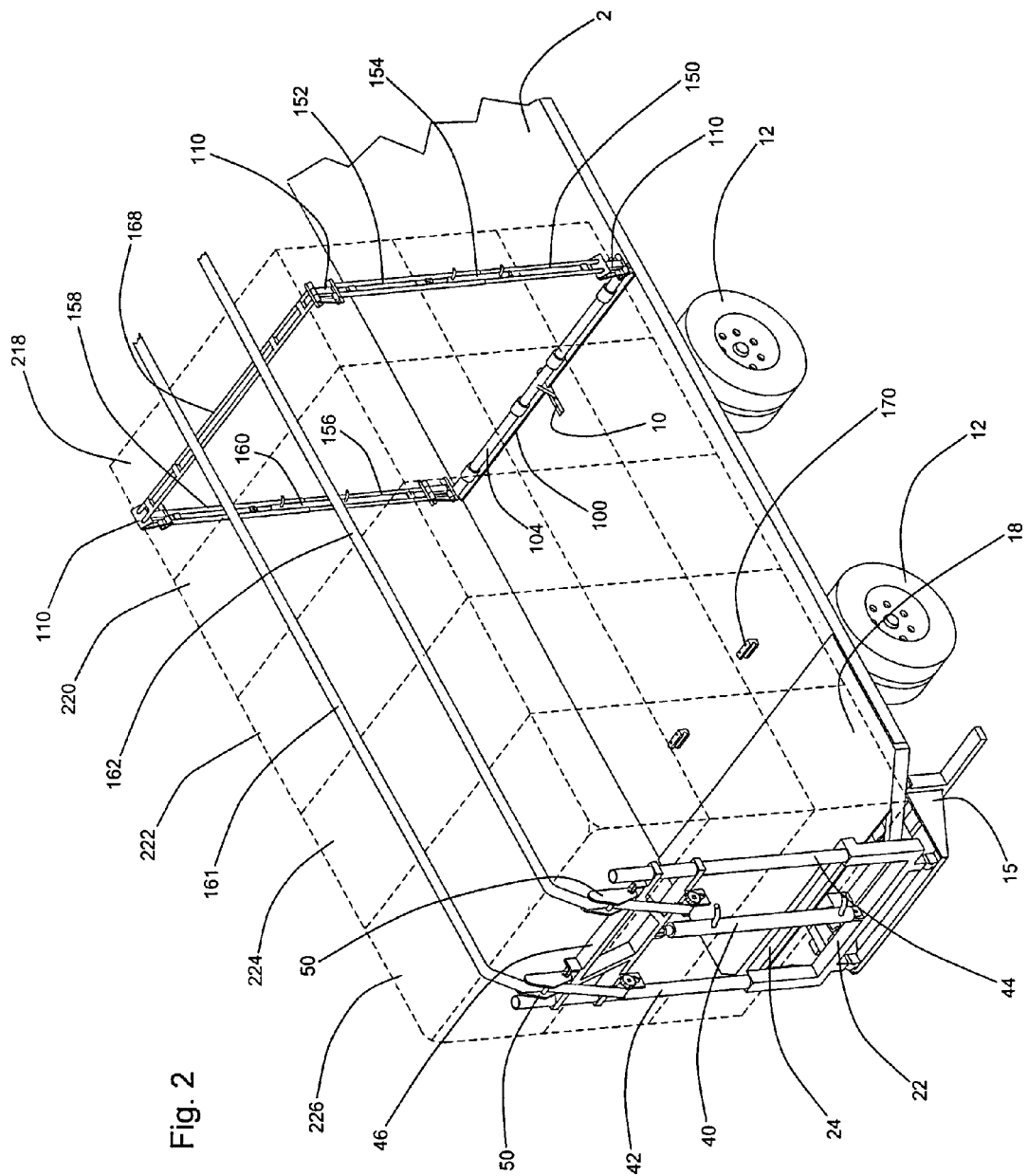
FIG. 2 is a magnified view of a portion of the structure depicted in FIG. 1.

Referring simultaneously to FIGS. 2, 3 and 4, such forward arm, as described above, is preferably rearwardly matched by a rearward tie supporting arm which similarly additionally functions as a load bulkhead. The rearward arm preferably consists of a base plate 18, a lower frame member 22 and 24 which is rigidly mounted to the base plate 18, right and left slide shafts 38 and 36, right and left slide sleeves 44 and 42 mounted over the right and left slide shafts 38 and 36, and an upper frame member 46 which spans between and rigidly interconnects the right and left slide sleeves 44 and 42. Like the forward bulkhead arm described above, the depicted rearward bulkhead arm preferably has an articulating upper or distal end which comprises pivoting and spring biased tension arms 50. Also, as with such forward bulkhead arm, the rearward bulkhead arm is alternatively upwardly extendable and downwardly retractable via a hydraulic cylinder telescoping means 40.

Referring simultaneously to FIGS. 1-4, the upper surface of the load bed 2, the longitudinally extending tie consisting of straps 161 and 162, the rearward bulkhead arm depicted in FIG. 2, and the forward bulkhead arm depicted in FIG. 3, in combination with each other define a longitudinally extending cargo securing space. As is shown in FIG. 1, cargo 200-226 shown in dashed lines is representative of 42 hay bales, such bales being stacked three high, each bale substantially spanning the lateral width of the load bed 2. Hay bales 200-226 are representative of cargo secured within such longitudinally extending load securing space.

Figure 5:
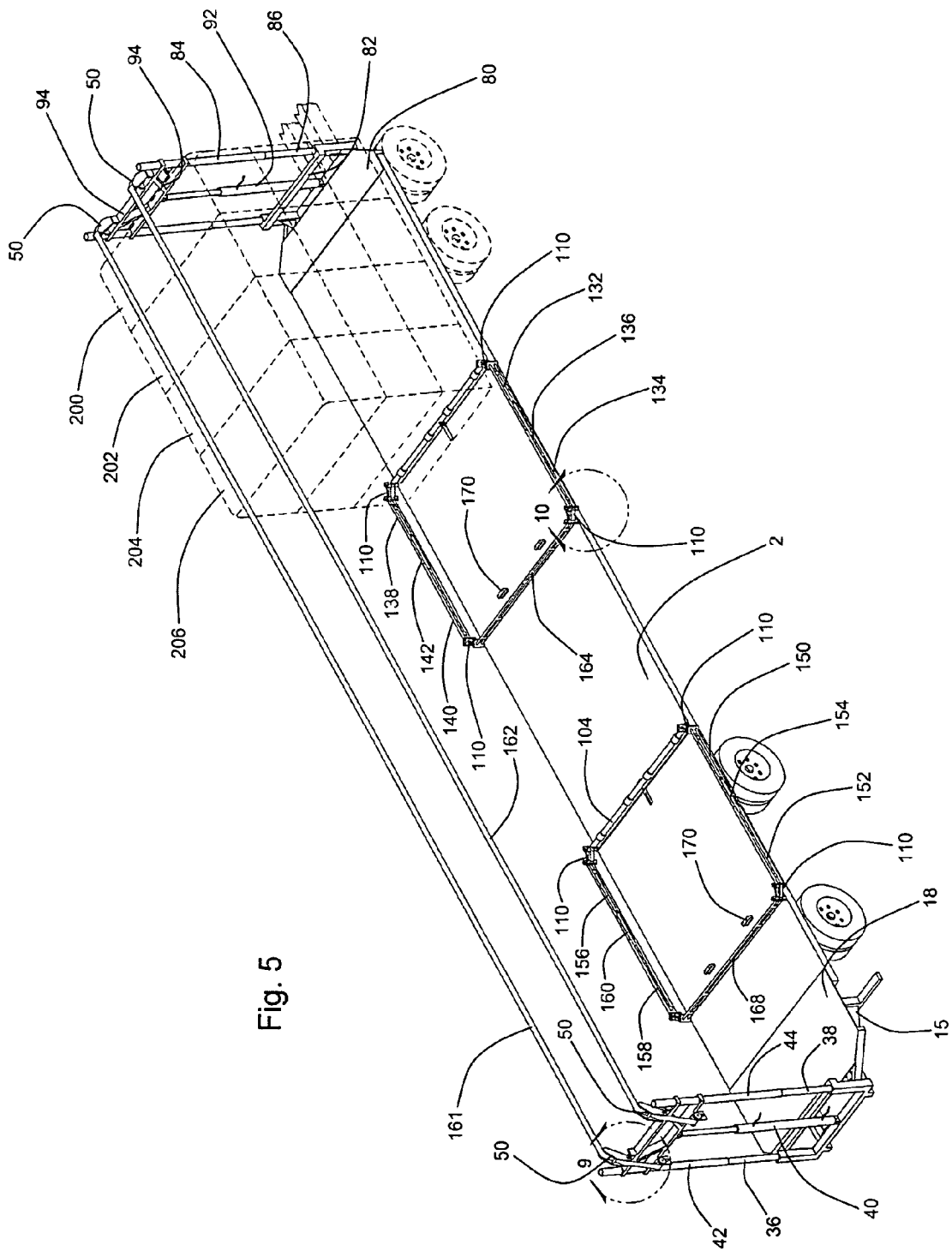
FIG. 5 redepicts FIG. 4, the view of FIG. 5 additionally including exemplary hay bales shown in dashed lines.
Figure 9:
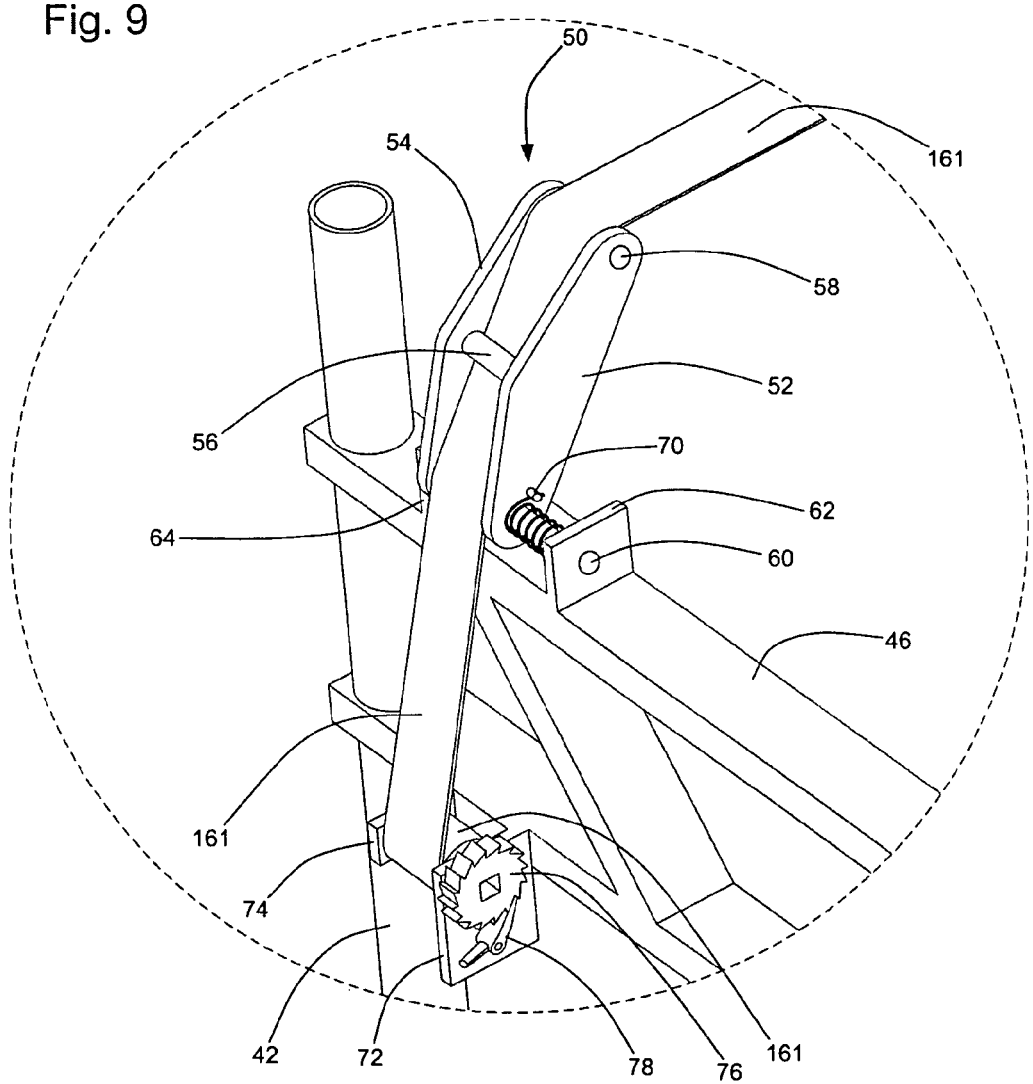
FIG. 9 is a partial magnified view as indicated in FIG. 5.

Referring simultaneously to FIGS. 5 and 9, the structure of each of the articulating distal segments of the front and rear bulkhead arms is shown in enhanced detail. Each of such articulating assemblies 50 preferably comprises right and left plates 52 and 54, such plates being pivotally mounted upon a pivot axle 60, which axle is supported upon frame 46 by clevis ears 62 and 64. Cross bars 56 and 58 rigidly interconnect plates 52 and 54 to form a ladder frame, and strap 161 is installed within such ladder frame to overlie bar 58, to underlie bar 56, and to overlie axle 60. Spring biasing assemblies 70 normally pivot the distal strap tensioning segments of the bulkhead arms outwardly and away from the longitudinally extending load securing space in order to constantly provide tension to the straps 161 or 162. Strap winch assemblies consisting of clevis ears 72 and 74, a ratchet wheel 76, and a releasable locking pawl 78 are advantageously provided at each of the ends of the straps 161 and 162, such winch assemblies advantageously allowing for re-positioning and adjustment of the extensions of the straps 161 and 162 in relation to the forward and rearward bulkhead arms. As shown in FIG. 1, each of the four depicted upper or distal strap tensioning segments 50 is configured substantially identically with the assembly detailed in FIG. 9.

Referring simultaneously to FIGS. 1 and 4, simultaneous actuations of the front and rear hydraulic cylinder telescoping means 92 and 40 vertically extends the forward and rearward bulkhead arms from the configuration depicted in FIG. 1 to that of FIG. 4, such upward motion raising the tie represented by straps 161 and 162 with respect to the load bed. Opposite actuation of cylinders 92 and 40 draws such tie downwardly to vertically secure bales 200-226.

Referring simultaneously to FIGS. 1 and 7, the front and rear bulkhead arms preferably further incorporate clamping means for applying a longitudinally directed load securing pressure to the bales 200-226, such clamping means preferably comprising a third quill and shaft assembly (i.e., a quill and shaft assembly in addition to the first and second which are operable to extend and retract the front and rear bulkhead arms). The quills or slide sleeves 26 of such assemblies are preferably fixedly mounted upon the left and right chassis beams 4 and 6 underlying the load bed 2, and slide shafts 28 preferably slidably extend longitudinally rearwardly therefrom. The rearward ends of the slide shafts 28 are preferably fixedly attached to the lower frame member 24 of the rearward bulkhead arm, and a rigidly attached gusset brace 20 adds vertical rigidity to the perpendicular orientation of the bulkhead arm with respect to the slide shafts 28. A third linear motion actuator is provided for imposing longitudinal motion upon the rearward bulkhead arm and its slide shafts 28, such actuator preferably comprising a pair of hydraulic cylinders 32 and 34. In the position depicted in FIG. 7, the rearward bulkhead arm is displaced rearwardly to increase the relative longitudinal displacement between the front and rear bulkhead arms, such positioning advantageously facilitating loading or off loading of bales 200-226. An opposite actuation of hydraulic cylinders 32 and 34 to draw the rearward bulkhead arm forwardly advantageously moves such arm to the configuration depicted in FIG. 1 to longitudinally compress and secure the bales 200-226.

Referring simultaneously to FIGS. 1, 2, 3, 5, 6, and 10, just as the articulating strap tensioning segments 50 constitute first articulating means with respect to the front and rear bulkhead arms, alternatively configured first articulating means are preferably mechanically associated with the depicted laterally paired arms, such alternative first articulating means preferably comprising the four bar pivot linkages which are 110 which are further discussed below.

Referring in particular to FIG. 3, a forwardly oriented pair of oppositely laterally positioned arms are preferably provided, a left arm of which preferably comprises a quill and slide shaft combination 140 and 138, and a right arm of which similarly comprises a quill and slide shaft combination 134 and 132. A substantially rigid cross bar tie 164 preferably spans between and interconnects the distal ends of such left and right paired arms, and linear motion actuators, preferably right and left hydraulic cylinders 136 and 142, are operatively connected to such quill and slide shaft combinations for alternatively distally extending and proximally retracting such arms. Such alternative distal extension and proximal retraction of such laterally paired arms advantageously raises and lowers the cross bar 164.

Figure 10:
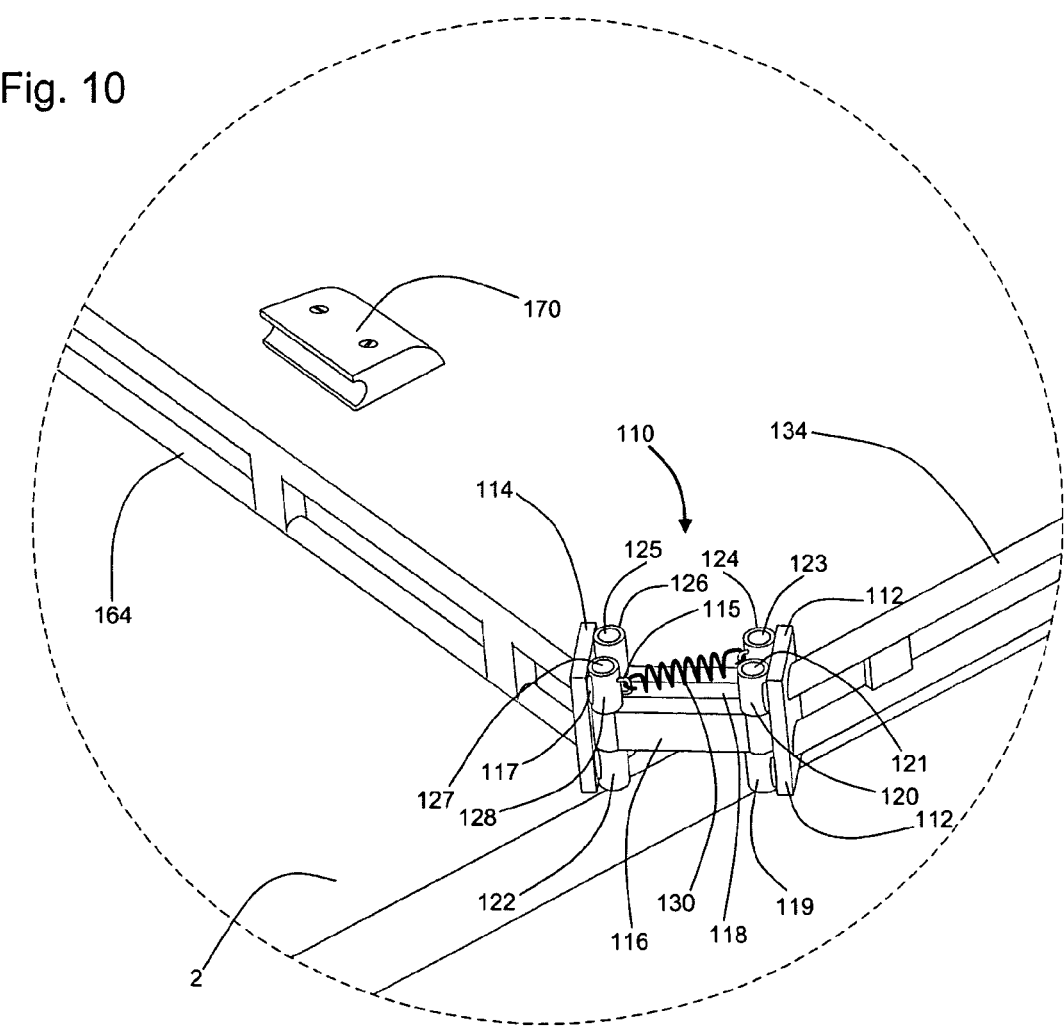
FIG. 10 is an alternative partial magnified view as indicated in FIG. 5.

Referring in particular to FIG. 10, the first articulating means configuration which is preferably associated with the laterally paired arms of the instant invention is depicted, such means preferably comprising one of the pivoting four bar linkages 110. The bars of such four bar linkages 110 preferably comprise a slide shaft end plate 112, an outer pivot bar 116, a cross bar end plate 114, and an inner pivot bar 118. Pivot axles 127 and 121 are preferably fixedly attached to the ends of the outer pivot bar 116, and pivot axles 125 and 123 are preferably similarly attached to the ends of the inner pivot bar 118. Bearing sleeves 128 and 122 attached by welds 117 to plate 114 receive axle 127. Similarly, bearing sleeves 120 and 119 which are similarly attached to plate 112 receive axle 121. Bearing sleeves 124 and 126 respectively attached to plates 112 and 114 similarly respectively receive axles 123 and 125. Biasing means, preferably in the form of a spring 130, preferably attaches to loops 115 to cross the depicted pivoting four bar linkage and to normally spring bias and pivotally move the depicted four bar linkage inwardly with respect to the slide sleeve arm component 134. Referring further simultaneously to FIGS. 2 and 3, each of the eight depicted four bar linkages 110 is preferably configured substantially identically with the four bar linkage depicted in FIG. 10.

Figure 6:
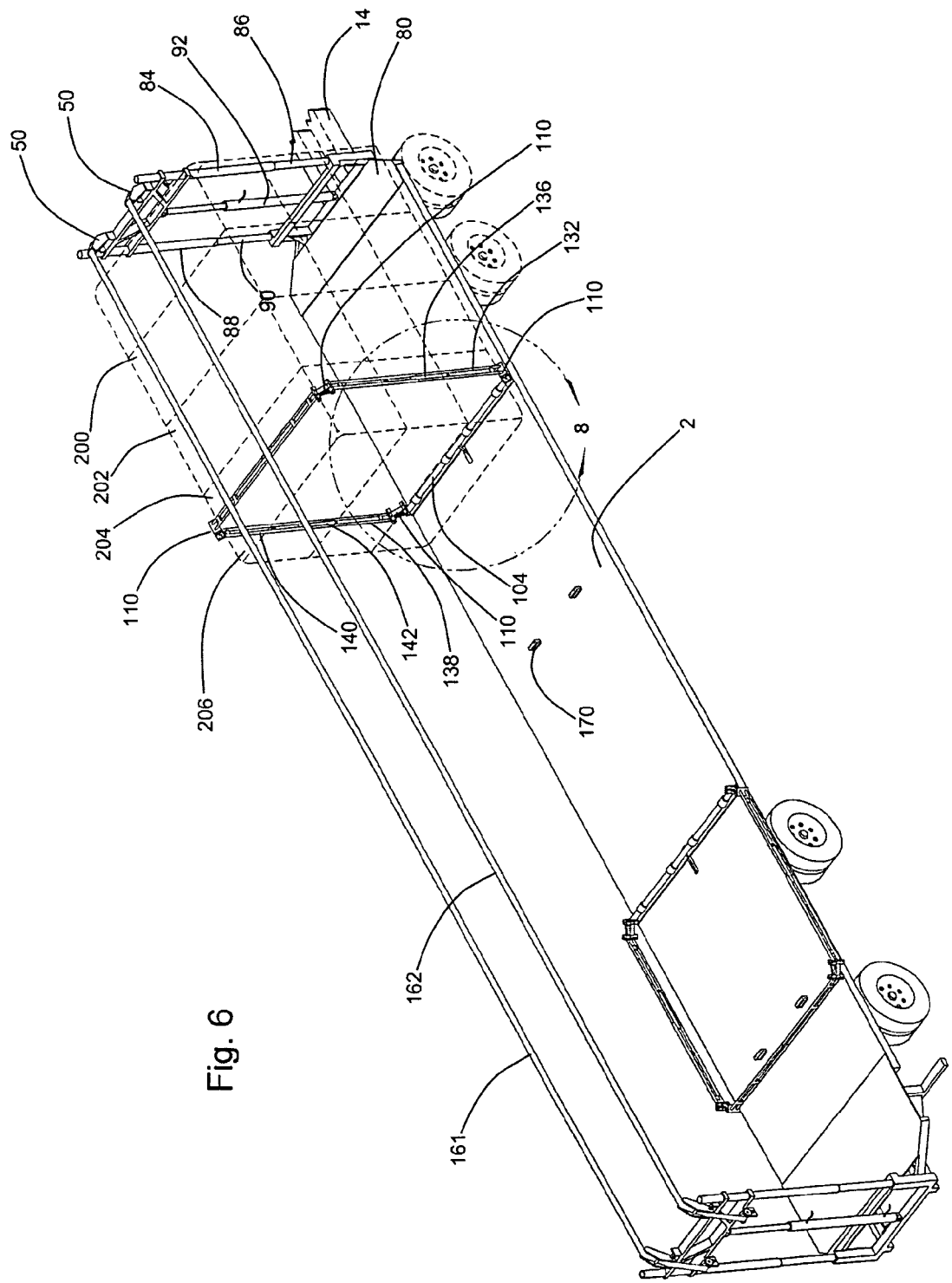
FIG. 6 redepicts FIG. 5, the view of FIG. 6 alternatively showing one of the tie and paired arms assemblies pivoted upwardly over the exemplary hay bales.
Figure 8:
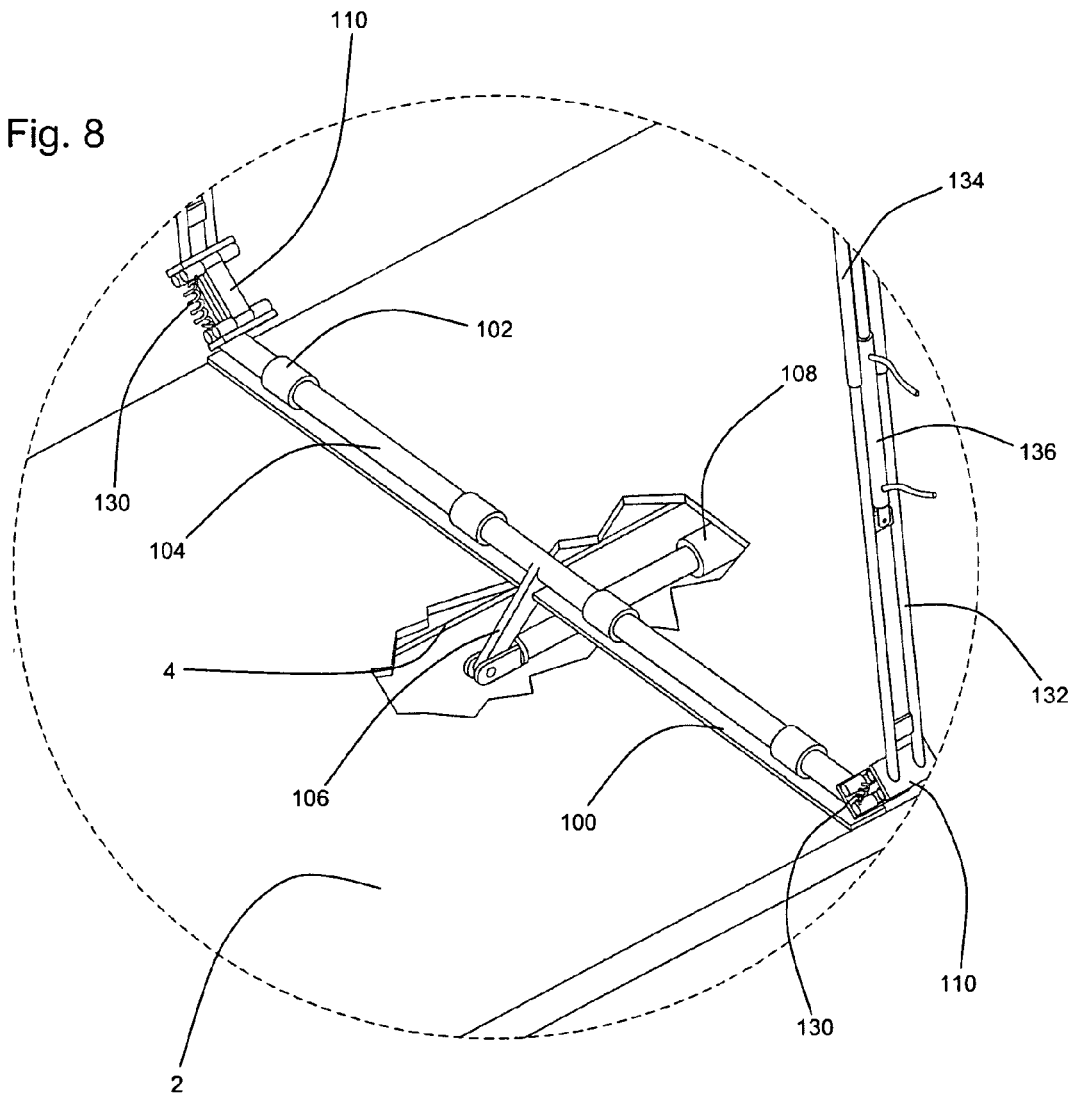
FIG. 8 is a partial magnified view as indicated in FIG. 6.

Referring simultaneously to FIGS. 6 and 8, while the four bar linkages 110 are recognized as first articulating means associated with the depicted left and right arms, and second articulating means are preferably further associated with such arms. Such second articulating means preferably comprises a lower pivot axle 104 which preferably spans laterally between and rigidly interconnects the lower or proximal ends of the left and right arms. The pivot axle 104 is preferably rotatably received by bearing sleeves 102, and such sleeves are preferably fixedly mounted upon a laterally extending mounting plate 100. In turn, the mounting plate 100 is preferably fixedly mounted upon the upper surface of the load bed 2. A further component of the second articulating means preferably comprises a lever arm 106 which is rigidly attached to and extends from the pivot axle 104. Referring further to FIG. 3, such lever 106 preferably extends downwardly through a slot aperture 8 within the load bed 2. A hydraulic cylinder actuator 108 preferably operatively spans between the distal end of the lever arm 106 and a solid structural mounting point beneath the load bed 2. Extending operation of the hydraulic cylinder 108 rotates the lever arm 106 in the clockwise direction to rotate and pivot the pivot axle 104, the left and right arms, and the cross bar 164 to the upwardly extending load securing position depicted in FIG. 6. Opposite actuation of the hydraulic cylinder 108 counter rotates each of such structures to cause such arms and cross bar to co-extensively overlie and extend along the load bed 2 as is depicted in FIG. 5.

Referring simultaneously to FIGS. 2 and 3, a second and relatively rearwardly positioned pair of articulating arms are preferably provided, such second arm pair, like the first pair depicted in FIG. 3, preferably comprising left and right quill and slide shaft combinations 158, 156, 152, and 150. Like the forward pair of articulating arms, such rearward pair are actuated for alternative distal extension and proximal retraction by left and right hydraulic cylinders 160 and 154. A substantially rigid cross bar tie 168 also preferably laterally spans between the distal ends of such articulating arms. A second pivoting and articulating means substantially similar to that depicted in FIG. 8 is preferably operatively connected to such rearwardly positioned pair of arms, the lever arm of such second articulating means preferably extending through a second slot aperture 10 within the load bed 2.

Referring to FIG. 2, it may observed that the depicted left arm comprises pivoting or articulating distal and proximal sections 110, and a medial section consisting of slide sleeve 158 and slide shaft 156. The depicted right arm similarly includes distal and proximal sections 110 and a medial section consisting of slide sleeve 152 and slide shaft 150. Simultaneous actuation of hydraulic cylinders 154 and 160 causes slide sleeves 158 and 152 to downwardly slidably move over their slide shafts 156 and 150, causing the cross bar tie 168 to simultaneously draw downwardly against and vertically downwardly compress bale stack 218. Upon such downwardly drawing action imposed by the cylinders 160 and 154, each of the arms' proximal and distal articulating sections 110 pivots with respect to the tie 168 inwardly toward the bale securing space which is defined by the load bed 2, the cross bar 168, and such left and right arms. Upon such drawing action, the medial sections of such left and right arms are also drawn laterally inwardly into flush and securing contact against the end surfaces of the bales 218. Referring in particular to FIG. 3, similar actuation of hydraulic cylinders 142 and 136 inwardly draws the medial portions of those depicted left and right arms into securing contact against the ends of bales 206.

Referring further simultaneously to FIGS. 2 and 3, opposite and upward actuation of hydraulic cylinders 160, 154, 142, and 136 raises the cross bar ties 168 and 164 over the upper surfaces of the bales 218 and 206, and simultaneously allows, referring further to FIG. 10, springs 130 to outwardly pivot each of the eight four bar linkages 110 and to cause each of the medial portions of each of the left and right arms to move laterally outwardly and away from the left and right ends of the bales 206 and 218. Accordingly, such opposite extending actuation of hydraulic cylinders 160, 154, 142, and 136 serves to expand the two laterally extending load securing spaces to provide clearance above, and leftwardly, and rightwardly from the bale stacks 206 and 218.

In operation of the instant inventive assembly, referring simultaneously to FIGS. 4, 7, and 8, hydraulic cylinders 92, 40, 32, 34, and 108 may be initially actuated to raise tie straps 161 and 162, to rearwardly extend the rearward bulkhead arm, to distally extend the cross bar ties 164 and 168, and to co-extensively lay the laterally paired arms against the load bed 2, all as depicted in FIG. 4. Thereafter, as depicted in FIG. 5, bales 200, 202, 204, and 206 may be loaded via lateral movement onto the load bed 2, the bale stack 206 directly overlying the forward pivot axle 104. Thereafter, referring further to FIG. 6, hydraulic cylinder 108 may be actuated for extension to pivot the forward laterally paired arms and their cross bar tie 164 from the position depicted in FIG. 5 to the perpendicular and upwardly extending position depicted in FIG. 6. Thereafter, referring further to FIG. 1, bale stacks 208, 210, 212, 214, 216, and 218 may be similarly loaded, and the rearwardly positioned pair of arms and cross bar tie 168 may be similarly articulated thereover. Thereafter, bale stacks 220, 222, 224, and 226 may be loaded. Upon such loading of bales 200-226, each of the linear motion actuating hydraulic cylinders referenced above may be oppositely actuated, causing the flexible ties 161 and 162 to compress downwardly against the bales, causing the laterally extending tie bars 164 and 168 to compress downwardly against bale stacks 206 and 218, and causing the forward and rearward bulkhead arms to longitudinally clamp and secure all bales. A reversal of cylinder actuation and bale loading steps described above conveniently facilitates an off loading of the bales 200-226.

Referring to FIG. 4, in order to prevent the laterally extending cross bar ties 164 and 168 from bouncing and rattling against the load bed 2 during trailering without loaded hay bales, cross bar hooks 170 which are fixedly attached to the load bed 2 are preferably provided. Actuation of hydraulic cylinders 136, 142, 154, and 160 to forwardly draw the cross bar ties 168 and 164 against such hooks 170 advantageously secures such cross bars in place for loadless over the road carriage.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. An assembly for securing cargo, the assembly comprising:
    (a) a load bed having oppositely positioned paired sides;
    (b) at least a first pair of arms, each arm having a proximal end and a distal end;
    (c) arm attaching means interconnecting the load bed and the proximal ends of the arms, the arm attaching means oppositely positioning the arms at one of the load bed's oppositely positioned paired sides;
    (d) a tie having a pair of ends;
    (e) tie attaching means interconnecting the tie's ends and the arms' distal ends so that the load bed, the arms, and the tie border a first cargo securing space; and
    (f) telescoping means connected operatively to the arms, the telescoping means being adapted for alternatively distally expanding and proximally contracting the first cargo securing space.

2. The assembly of claim 1 further comprising first articulating means connected operatively to the arms, the first articulating means being adapted for alternatively pivoting and counter pivoting arm ends selected from the group consisting of the arms' proximal and distal ends, and the arms' distal ends.

3. The assembly of claim 2 wherein the load bed's oppositely positioned side pairs comprise left and right sides and front and rear ends.

4. The assembly of claim 3 wherein the telescoping means comprises a pair of quill and slide shaft assemblies.

5. The assembly of claim 4 wherein the telescoping means further comprise a pair of linear motion actuators connected operatively to the quill and slide shaft assemblies.

6. The assembly of claim 5 wherein each of the linear motion actuators comprises hydraulic cylinders.

7. The assembly of claim 5 wherein the arm attaching means position the arms at the load bed's left and right sides, and further comprising second articulating means connected operatively to the arms, the second articulating means being adapted for longitudinally pivoting the arms and the tie between a cargo loading position and a cargo securing position, the arms extending along the load bed upon pivoting to the cargo loading position, the arms extending upwardly from the load bed upon pivoting to the cargo securing position.

8. The assembly of claim 7 wherein the second articulating means comprises a pivot axle.

9. The assembly of claim 8 wherein the second articulating means further comprises a lever fixedly attached to the pivot axle.

10. The assembly of claim 9 wherein the second articulating means further comprises a hydraulic cylinder connected operatively to the lever.

11. The assembly of claim 7 wherein the first articulating means segments each of the arms into a medial laterally movable section, into a proximal laterally pivotable section, and into a distal laterally pivotable section.

12. The assembly of claim 11 further comprising biasing means connected operatively to the arms' proximal and distal laterally pivotable sections, the biasing means normally outwardly laterally pivoting said sections.

13. The assembly of claim 12 wherein each of the arms' laterally pivotable sections comprises a four bar linkage.

14. The assembly of claim 13 wherein the biasing means comprise a plurality of springs, each spring among the plurality of springs diagonally spanning across one of the four bar linkages.

15. The assembly of claim 14 wherein the tie comprises a cross bar having a pair of ends, each of the cross bar's ends being configured to present one of the four bar linkages' bars.

16. The assembly of claim 7 further comprising a second cargo securing space positioned rearwardly from the first cargo securing space, the second cargo securing space being bordered by the load bed, by a second pair of longitudinally pivotable arms, and by a second tie spanning laterally between the second pair of longitudinally pivotable arms.

17. The assembly of claim 5 wherein the arm attaching means positions the arms at the load bed's front and rear ends, the arms being longitudinally displaced away from each other, and further comprising clamping means connected operatively to the arms, the clamping means being adapted for alternatively increasing and decreasing the arms' longitudinal displacement.

18. The assembly of claim 17 wherein the clamping means comprises a third quill and slide shaft assembly.

19. The assembly of claim 18 wherein the clamping means further comprises at least a third linear motion actuator connected operatively to the third quill and slide shaft assembly.

20. The assembly of claim 19 wherein the at least third linear motion actuator comprises a hydraulic cylinder.

21. The assembly of claim 17 wherein the tie comprises at least a pair of longitudinally extending flexible straps.

22. The assembly of claim 21 wherein the arms' distal ends comprise a plurality of tensioning arms, and wherein the first articulating means comprises a plurality of pivot joints connected operatively to the tensioning arms, each tensioning arm being connected operatively to an end of one of the flexible straps.

23. The assembly of claim 22 further comprising biasing means connected operatively to the tensioning arms, the biasing means normally longitudinally pivoting the tensioning arms outwardly from the first cargo securing space.

24. The assembly of claim 23 wherein the tie attaching means comprises a plurality of strap winches.

25. The assembly of claim 24 wherein the biasing means comprise a plurality of springs.

26. The assembly of claim 17 further comprising at least a second cargo securing space, the at least second cargo securing space being positioned to intersect the first cargo securing space, the at least second cargo securing space being bordered by the load bed, a second pair of arms positioned at opposing left and right sides of the load bed, and further comprising at least a second tie spanning laterally between said arms of said second pair of arms.

* * * * *